Aug. 6, 1935.                H. HOLZWARTH                2,010,022
                        COOLING OF GAS TURBINE BLADES
                          Filed June 23, 1932          3 Sheets-Sheet 2
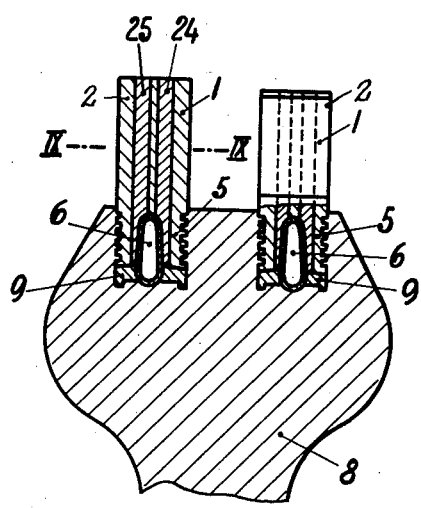
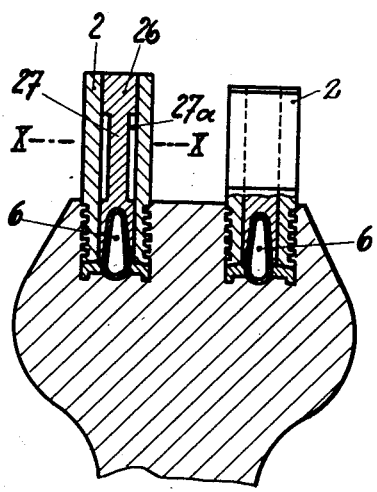
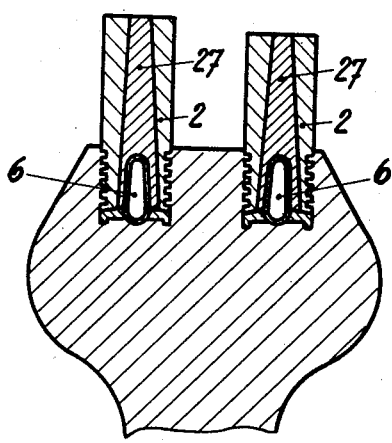
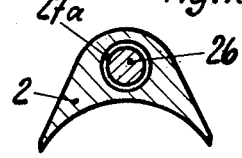
Inventor
Hans Holzwarth Aug. 6, 1935.  H. HOLZWARTH  2,010,022
COOLING OF GAS TURBINE BLADES
Filed June 23, 1932   3 Sheets-Sheet 3

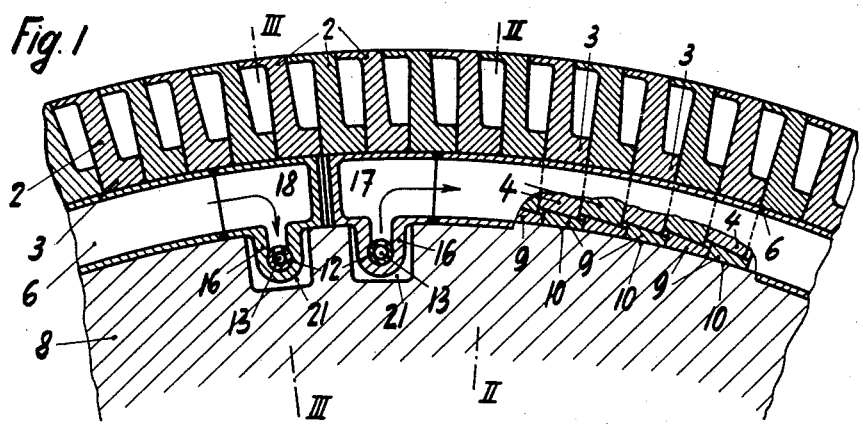
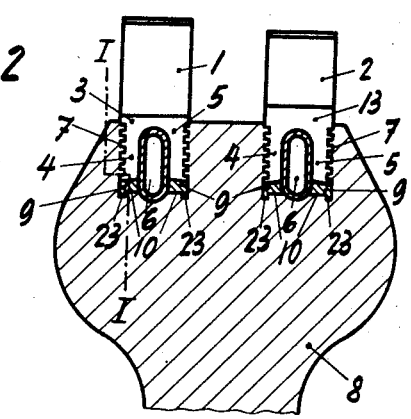
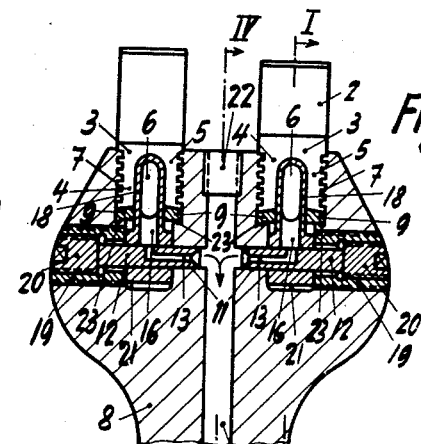
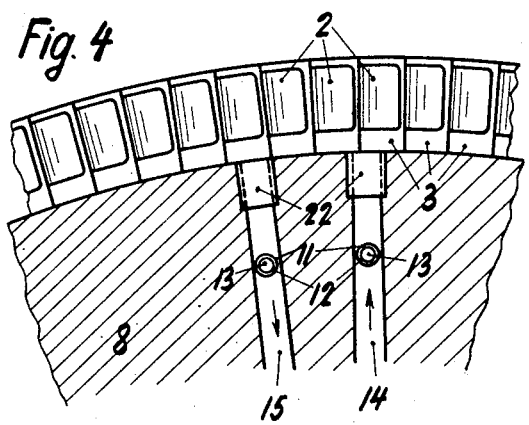
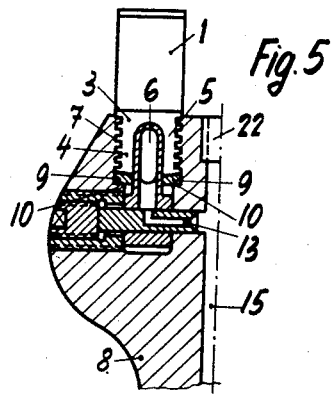

Inventor
Hans Holzwarth

Patented Aug. 6, 1935

2,010,022

UNITED STATES PATENT OFFICE 2,010,022

COOLING OF GAS TURBINE BLADES

Hans Holzwarth, Dusseldorf, Germany, assignor to Holzwarth Gas Turbine Co., San Francisco, Calif., a corporation of Delaware Application June 23, 1932, Serial No. 618,832
In Germany June 27, 1931

20 Claims. (Cl. 60—41)

The present invention relates to the construction of gas turbine rotors, and particularly to devices for cooling the blades of such rotors.

A great variety of modes and devices for cooling the blades of combustion gas turbines have already been proposed. Such cooling causes particular difficulties in the case of rotor blades because the leading in and leading out conduits for the cooling agent must be connected to a moving machine part. This cooling has been attempted in a particularly simple manner by streaming the rotor rim with a cooling agent. This method of cooling, has however, the disadvantage that the heat to be conducted away is carried off indirectly from the foot of the blade through the rim of the rotor so that to avoid a temperature jump between the blade foot and the rotor rim, a firm and solid seating of the blade foot flanks against the corresponding walls of the blade channels in the rotor rim becomes necessary. As the blade foot and the rotor rim are clamped together throughout by interlocking teeth, then at least the upper and lower tooth flanks of the blade foot must lie firmly against the corresponding walls of the annular grooves in the rim. By causing the contiguous surfaces of the rotor rim and the blade feet to act also as heat conducting surfaces, there is made necessary, however, the arrangement of a series of places upon the circumference of the rotor whereat the blades are inserted, because if only a single blade inserting place were provided, it would be necessary to force a blade along large portions of the rotor periphery and along the many teeth-receiving grooves, so that the carefully machined flanks of the blade would become so greatly worn down by the time the blade reached its apportioned place that the exact machining of the blade would be destroyed. Corresponding to the plurality of filling places, a plurality of closure blades is likewise necessary, so that a comparatively complicated and expensive cooling arrangement results. If, in an arrangement of this type, the heat conducting connection between the blade foot and rotor rim is not secured, the blade very soon assumes temperatures at which the stresses on the blade lie in the neighborhood of, or indeed beyond, the limit of the creeping strength of the blade material, so that the reliability of the turbine is endangered. (By creeping strength is meant the maximum load to which a material can be subjected continuously for a long period of time, say 10.000 hrs. at a given temperature without producing more than a definite permanent elongation, say 1%. The creeping strength falls as the temperature increases.)

It is the object of the present invention to provide a simple and efficient arrangement for cooling the turbine blades. The invention is based upon my discovery that by direct cooling of only the foot of the blade just so much heat is conducted away from the gas impinged part of the blade as is necessary to maintain the blade at the proper strength; the heat losses consequently are limited to a degree which in no wise injures the economy or efficiency of the plant. The improved mode and mechanism for cooling the turbine blades according to the invention is characterized by the fact that the blade foot is brought into heat exchange relation with a flowing cooling agent through a tubular wall arranged in the turbine rotor. To this end there is arranged an annular cooling space in the blade rim concentrically with the latter, such space being arranged as close as possible to the blade feet and being traversed by a cooling agent.

One of the devices for carrying out my improved mode of cooling consists of a tubular body providing the cooling space and inserted in a suitable groove or channel in the rotor rim. The cooling agent thus operates through the wall of the tubular body upon the ring of blades. In another embodiment of the invention, which will be described in detail below, a completely closed hollow space is formed in the material of the rotor rim itself and is traversed by a cooling agent. In both of these arrangements it is advantageous to arrange the annular hollow space in the intermediate space produced by bifurcating the blade foot.

Several embodiments of my invention are illustrated by way of example on the accompanying drawings, wherein Fig. 1 shows at the left-hand side thereof a section through the peripheral portion of a turbine rotor perpendicular to the rotor axis and taken along the line I—I of Fig. 3, the right hand side showing a partial section along the line I—I of Fig. 2;

Fig. 2 is a radial section along the line II—II of Fig. 1;

Fig. 3 is a radial section through the line III—III of Fig. 1;

Fig. 4 shows a section perpendicular to the rotor axis along the line IV—IV of Fig. 3;

Fig. 5 illustrates a section similar to Fig. 2 with the difference that the wedges have a reverse inclination in axial direction;

Figure 12:
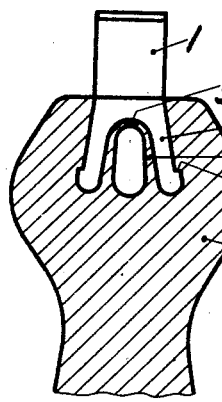
Figure 13:
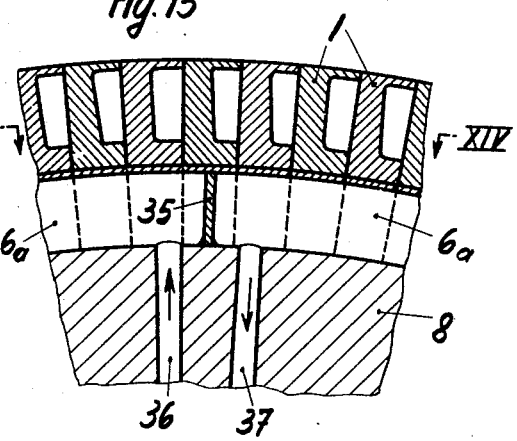
Figure 11:
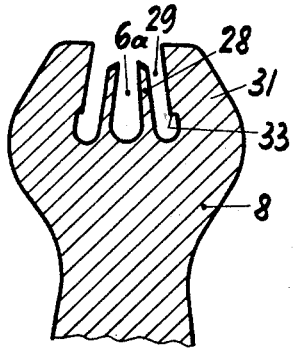
Figure 14:
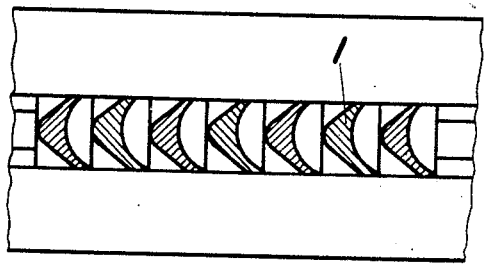
Figure 15:
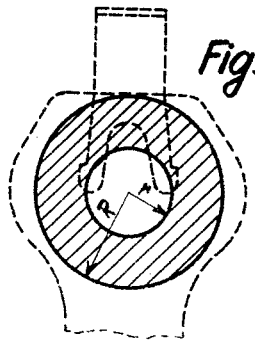
Figure 16:
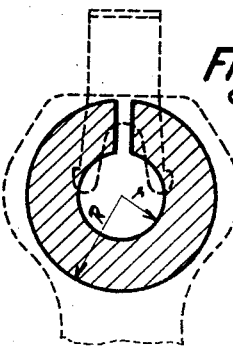

Figs. 6, 7, and 8 illustrate views similar to Fig. 2 of different embodiments of the invention;

Figs. 9 and 10 are sections along the lines IX—IX of Fig. 6 and X—X of Fig. 7, respectively;

Figs. 11 and 12 show vertical sections through a rotor blade ring in which the cooling channel or tube is formed of the material of the rotor itself, Fig. 11 showing the blank structure before the formation of the tube and Fig. 12 showing the construction after the tube has been formed;

Fig. 13 is a vertical longitudinal section in the central plane of the rotor through a blade ring composed of built-in blades;

Fig. 14 is a circumferential section through the blade ring along the line XIV—XIV of Fig. 13; and Figs. 15 and 16 illustrate diagrammatically the strength relations of the two different types of blade rings.

Figs. 1 to 5 show an arrangement according to the invention wherein the turbine blade feet are directly cooled. As shown in Fig. 2, the blades 1 and 2 have blade feet 3 which are bifurcated as shown at 4, 5. In the space between the blade foot furcations 4 and 5 is embedded a cooling tube 6 through which the cooling agent flows. The furcations 4 and 5 are provided in known manner with teeth 7 which are received in corresponding annular grooves in the rotor rim 8. As the direct cooling of the blade feet and hence of the blades themselves is attained according to the invention by the use of a closed cooling tube 6, it is merely necessary to provide a rigid connection between the blades and the rotor through the teeth 7 and the corresponding grooves in the rotor rim 8, and it suffices to provide a firm seat for the upper flanks of the blade teeth against the lower flanks of the rotor grooves. This firm seating is secured by wedges 9 arranged between the blade furcations 4, 5 and the bottom 10 of the blade foot channel. The wedges 9 have, in addition to the inclination in the direction in which they are driven in (see Fig. 1), also an inclination from the middle of the rim toward the exterior (see Figs. 2 and 3) which prevents displacement of the blade furcations 4 and 5 toward the middle of the rim and thus prevents compression of or injury to the cooling tube 6. The wedges 9 are preferably provided for the same reason with shoulders 23 at their lower side which engage within a corresponding depression in the bottom of the blade channel in the rotor rim and insure against lateral movement of the wedges.

Under the influence of centrifugal force there arise in the cooling tube 6 during the operation of the turbine, for example when water is used as a cooling agent, pressures up to about 200 atms. In such case the construction of the wedge 9 shown in Fig. 5 has certain advantages. The upper surface of this wedge has, in addition to the inclination in the tangential direction in which it is driven in (see Fig. 1), also a downward inclination from the outer sides of the blades toward the center of the ring of blades. In such construction the transfer of the large pressure forces exerted by the cooling tube 6 upon the furcations 4 and 5 does not occur directly through the blade furcations upon the flanks of the rotor rim, but indirectly through the wedge 9, it being understood that the blade teeth do not engage the rotor flanks in an axial direction while the outer, vertical surfaces of wedges do so engage said flanks. The application of the force upon the flanks of the rotor rim 8 thus occurs with a considerably reduced moment arm since the wedges are nearer to the base of the rim flanks than are the blade teeth, so that a considerable reduction in the bending force upon the rotor flanks is produced.

Under the influence of the high pressure of the cooling agent the cooling tube spreads or expands, the walls of such tube being yielding, so that the walls are forced against the blade foot furcations 4 and 5. In this manner the direct cooling of the blade feet 3 and thus of the blades themselves is accomplished. To attain a completely undisturbed flow of heat, there can, however, also be produced a metallic connection between the blade feet 3 or the blade foot furcations 4 and 5 and the cooling tube 6 by filling in the intervening spaces between these parts with solder, lead, or other metal. By so providing a direct heat-conducting connection between the blade foot and the cooling tube 6 in accordance with the invention, the heretofore necessary exact fitting of the upper and lower blade teeth flanks against the corresponding flanks of the grooves in the blade annular channel, which was required when the rotor rim was cooled by directing streams of cooling agent thereagainst, is avoided, so that without injuring this fitting it suffices to employ only a single filling place and a single closure blade. In this way the construction of the rotor is greatly simplified and the reliability in operation of my improved structure greatly increased.

In the embodiments of the invention just described, a single cooling tube is provided for each row of blades 1 or 2. It is, however, within the scope of the invention to provide a number of cooling tubes or tube segments, one each for a group of blades, and to connect these tube segments, as regards their cooling agent inlets and outlets, in parallel, in series, or partly in parallel and partly in series. A single inlet and outlet for the cooling agent can be provided for a cooling tube common to all the blades; there may, however, also be arranged a plurality of cooling agent inlets and outlets, the common cooling tube being thus traversed by several cooling medium circuits.

The drawings (Figs. 1, 3, 4 and 5) show constructions wherein the cooling tube common to all the blades has a single cooling agent inlet and outlet. The introduction and withdrawal of the cooling agent occurs through cock-like conical bolts 12 which are received in transverse bores 11 in the body of the rotor 8 (see Fig. 3), the bores 13 of such bolts being in communication on the one hand with the radial bores 14 and 15 provided in the rotor body 8 for introducing and carrying off the cooling agent, and on the other hand with the cooling elements traversed by the cooling agent and disposed at the feet of the blades and combined into a cooling tube 6. The bolts 12 are received in enlargements 16 of the end pieces 18 of the cooling tube 6, the hollow screws 19 forcing the enlargements 16 close against the rotor body while plugs 20 received in the hollow screws 19 hold the bolts tight. Suitable recesses 21 in the rotor body serve to receive the enlargements 16. The radial bores 14 and 15 are closed by plugs 22.

If the blades are divided into individual cooling groups a corresponding number of inlets and outlets for the cooling medium will have to be provided through the body of the rotor. There can be arranged a common cooling tube for all of the cooling groups, or there may be provided for each cooling group a cooling tube segment independent of the other segments. Special measures are then advantageous or necessary with the cooling arrangements herein described when the blades have a length exceeding a certain value. As the flow of heat must proceed from the outer end of the blade through the blade to the cooled foot thereof, the heat withdrawal requires a definite temperature drop from the head or outer end of the blade to the foot thereof. This temperature drop or differential is naturally greater for long blades than for short blades. The cooling of a part of the blade affords, however, only a limited temperature drop, which fact indicates the limitation in the use of the proposed process. The length of the blade to be cooled according to the proposed method is all the more limited, the more poorly the blade material conducts heat. In this connection the chrome-nickel steel alloys which have proved generally advantageous as blade material for gas turbines are particularly unfavorable because they conduct heat even more poorly than does ordinary iron.

According to the improvement set forth in Figs. 6 to 10 the problem of cooling unusually long blades and blades made of material which is a poor conductor of heat, is solved in that the heat withdrawal from the blade parts which are not cooled by the circulating cooling agent but which are struck by the driving gases is accomplished by means of good heat conductors inserted in the uncooled blade material and arranged rigidly therein and connected in heat conducting fashion with the cooled blade feet. In particular, the good heat conductors arranged fixedly in the blade can be connected in a heat conducting fashion with blade parts which are traversed by cooling agent, preferably with the built-in cooling tube. Good heat conductors are known. A heat conductor composed of copper has been found to be particularly suitable, as copper conducts heat approximately seven times better then does iron. This means also that the temperature drop for the good heat conducting blade core needs be only a seventh of that which would be required for a blade composed completely of iron. For the same amount of heat carried off the temperature of the end of the blade is thus reduced correspondingly by a blade with a copper core and is even lower in comparison with blades of chrome-nickel steel. The temperature of the rest of the blade, namely the portions surrounding the core, is likewise considerably reduced, so that for the same temperature at the end of the blade, blades with heat conducting cores can be made considerably longer.

In place of copper any other good heat conductor may be employed as the core material. In place of a solid heat conductor there may also be employed a fusible or liquid conductor, such as mercury which is vaporized in the head of the blade by the heat which it absorbs; the vapor condenses at the cooled portions of the blade, so that within the space in which the material of good heat conductivity is confined, a circuit is created which produces the required effect.

If the heat conductor is composed of a metal, for example, a copper core, it may with advantage be combined in heat conducting relation with the cooled blade parts by soldering; the soldering occurs preferably with the tube traversed by the cooling agent, through which tube the blade parts are cooled by the circulating cooling agent. According to the embodiment shown in Figs. 6 to 9 there is arranged at the foot 5 of the blades 1, a copper tube 6 which is traversed by the cooling medium, such tube being connected in heat conducting fashion with the blade foot furcations. The wedges 9 secure the anchoring of the blades in the usual manner. According to the further development of the invention above described, the withdrawal of heat from the parts 2 of the blades, which are struck by the driving gases but are not cooled by the circulating cooling medium, takes place through copper cores 24, 25 which are inserted in the blade material and are connected in heat-conducting relation with the blade parts to be cooled (1 or 2), as by soldering the same. It is not necessary to produce a heat conducting connection both with the cooled blade parts 5 and with the member 6 traversed by the cooling medium. It is sufficient if the heat taken up by the copper core at the head of the blade or in the blade parts 1 struck by the driving gases finds in any suitable way a temperature drop sufficient for its escape. The copper inserts are formed of two parts according to Figs. 6 and 9, while in the example shown in Figs. 7 and 10 only a single copper core is provided. This copper core rests directly upon the cooling tube 6, so that large, cooled contact surfaces arise which promote good heat transfer. Even without soldering or other metallic connection, the cooling tube 6, under the influence of centrifugal force, would be driven at high pressure against the copper cores, so that in this manner a satisfactory heat conducting connection would be obtained. Figs. 6 and 7 show cylindrical cores, while Fig. 8 illustrates a conical core; the shape of the copper core will usually be determined from the standpoint of expedience.

Experience has shown that in combustion gas turbine blades the highest temperature lies toward the tip of the blade. By constructing the copper core as shown at the left of Fig. 7 in such manner that it is connected in heat-conducting relation with the body of the blade only at the head or outer end and at the foot of the active portion of the blade, while it is insulated at the intermediate portion 27, as by means of depressions, cut-outs or in any other manner, there is obtained an approximately uniform temperature distribution over the whole body of the blade.

Experience has further shown that inside of a gas turbine blade the relation of stress to creeping strength (which is the most important property of a blade material working at very high temperatures) is most unfavorable in the middle portions of the blade. While the temperature is the highest at the outer end of the blade, and hence the creeping strength is the lowest at such place, there is practically no stress on the blade at such outer end. The stress is greatest at the foot of the blade, but the temperature, as a result of the cooling, is the lowest and hence the creeping strength is the highest. In the middle region of the blade the temperatures and stresses are high so that at this place the stress and the creeping strength approach closest to each other, that is, the lowest degree of safety exists at such place. It is within the scope of the invention so to arrange the heat-insulating cut-outs 27a or insulators in the copper core that the place having the most unfavorable ratio between stress and creeping strength is cooled the strongest.

In Figs. 11 to 14 there is illustrated an embodiment of the invention in which no special tubular member is employed for receiving the cooling agent in the blade rim, but rather the latter is so constructed that it receives the cooling agent directly. In this way there is obtained, in addition to a considerable simplification of the structure, the advantage that the introduction of the cooling agent takes place without any breakable joints, which are always subject to the danger of improper sealing.

As indicated more clearly in Figs. 11 and 12, annular flanges 28 are formed in the blade channel 29 out of the body of the rotor rim. As shown in Fig. 12, the free ends of both annular flanges are bent toward the medial plane of the rotor and are connected with each other to form a perfect seal by the single seam of solder or welding 30. The blades are inserted in the usual manner through one or more filling places (not shown) and pushed into their proper positions. The blade foot furcations 5 surround the member 28, 30 which receives the cooling agent and lie closely against its outer surface; they fill completely the remaining space of the blade channel 29 between the rotor cheeks 31 of the rotor ring 8. The blade furcations 5 have shoulders 32 which rest tightly against the similarly formed shoulders 33 on the rotor rim for taking up the centrifugal forces.

After the assembly of each blade the joints or interstices between the foot furcations 5 and the cheeks 31, between the blade foot furcations 5 and the outer surfaces of the member 28, 30, as well as between the individual blades 1 are filled in by welding or soldering, and in this manner the rotor rim 8 may be connected with the blade foot furcations 5 and the parts 28 into a solid whole. It is within the scope of the invention to fill only certain individual interstices by soldering or welding as when, for example, lower stresses occur.

Fig. 13 illustrates a satisfactory manner of conducting the cooling agent to and from the member 28, 30 through the blade rim 8. Before bending the annular flanges 28 there are inserted in the hollow space 6a between the flanges one or more dividing walls 35 which may be fixed by soldering or welding. By the use of a plurality of such walls the space 6a is divided into a plurality of sections. One or more inlet bores 36 and outlet bores 37 in the rotor body permit the flow of the cooling agent through the space 6a or its several divisions. There is thus obtained one or more cooling medium circuits through which the desired heat removal from the feet of the blades, and thus from the whole of the blades is effected. The bores 36 and 37 may lead to a central bore in the rotor in known manner through which they are supplied with cooling agent or through which the heated cooling agent is withdrawn in known manner.

Fig. 15 shows schematically the conditions which occur when the blades are connected into a solid unitary whole with each other and with the rotor cheeks 31 or with the member 28, 30, while Fig. 16 shows corresponding conditions in the case when the parts are not so connected. It can be seen that in the case of Fig. 12 the blade rim together with the assembled blades can be regarded as a thick walled tube which is under the internal pressure of the cooling shell, which tube, corresponding to the shape of the parts, is bent approximately in the form of a circle. On the other hand, the conditions in the case in which the parts are not united resemble those of a longitudinally cut tube, as is shown in Fig. 16. The relation of the strength of the non-soldered or non-welded rotor rim to that of the rotor rim which has been soldered or welded into a solid whole will therefore be approximately the same as the ratio of the strength of the comparison tubes of Figs. 15 and 16.

Calculation shows that when the inside radius $r$ is equal to 2 cm., the external radius $R$ to 6 cm. and the internal pressure to 200 atms. superpressure, there results for the closed cross-section of Fig. 15 a tangential tension of 376 kg/cm$^2$ and for the open cross section of Fig. 16 a tangential tension of 1200 kg/cm$^2$.

The greatest stress is therefore in the cut tube. The 3.25 times as large as in the uncut tube. The stresses in the rotor cheeks 31 are reduced to a corresponding degree when the blades, cheeks and, if desired, also the member which is traversed by the cooling agent, are connected, as contrasted with the stresses in the rotor cheeks in the case when these parts are not connected. As the rotor disk and thickness is dependent on the rotor ring dimensions, the whole rotor and thus also the rotor shaft can, for a given stress, be considerably reduced as compared with a construction in which the blades, cheeks and the member through which the cooling medium flows are not united into a single rigid whole. This union of the parts has the further advantage that small cracks in the welding seam 31 are rendered harmless by the welded joints between the blades and the rotor cheeks which provide the closure toward the outside.

The cooling medium may be water, steam, oil, diphenyl oxide or any other suitable substance, and may be recooled outside of the rotor.

It will be evident that certain features of my invention may be used without others and that variations may be resorted to within the scope of the appended claims without departing from the spirit of the invention.

I claim:

1. A cooled rotor suitable for use in gas turbines and particularly in explosion turbines, comprising a rotor body having a circumferential blade groove in the rim thereof, a ring of blades upon the rim of such rotor and fixed within said groove, a tubular member arranged in said rotor and contacting a plurality of the blade feet and being thereby in heat exchange relation with said blade feet, and means for introducing a cooling medium to and withdrawing such medium from said tubular member, said cooling medium abstracting heat from the blade feet through the wall of said tubular member, said member being closed except for the inlet and outlet for the cooling medium and affording a continuous, closed path for said medium out of communication with the joints between the blades and the rotor body.

2. A rotor as set forth in claim 1, wherein the feet of the blades are forked, said tubular member being positioned in the space between the furcations of said blades.

3. A cooled rotor suitable for use in gas turbines and particularly in explosion turbines, comprising a rotor body having a circumferential blade groove in the rim thereof, a ring of blades upon the rim of such rotor and fixed within said groove, a tubular member arranged in said rotor and contacting at least some of the blade feet so as to be in heat exchange relation with said blade feet, said blade feet being forked and said tubular member being of non-circular cross-section and formed of yielding walls, and means for introducing a cooling medium to and withdrawing such medium from said tubular member, said cooling medium abstracting heat from the blade feet through the wall of said tubular member and by its pressure forcing the walls of said member against the furcations of said blade feet.

4. A rotor as set forth in claim 1, wherein the feet of the blades are forked, said tubular member being positioned in the space between the furcations of said blades, and being connected with the blade feet by metallic fusion.

5. A rotor as set forth in claim 1, wherein the feet of the blades are forked, said tubular member being positioned in the space between the furcations of said blades, and wherein a single tubular member is common to all of the blades of the rotor.

6. A cooled rotor suitable for use in gas turbines and particularly in explosion turbines, comprising a rotor body, a ring of blades upon the rim of such rotor, a tubular member arranged in said rotor in the vicinity of the blade feet so as to be in heat exchange relation therewith, means for introducing a cooling medium to and withdrawing such medium from said tubular member, said blades being forked and receiving said tubular member between their furcations, a plurality of such members being connected into a single cooling tube serving a plurality of blades, and wedges arranged to fix the blades and cooling tube mutually in the rotor rim and lying simultaneously against the blade feet, the cooling tube and the rotor rim.

7. A rotor as set forth in claim 6, wherein the wedges are inclined both in the direction in which they are driven in and also in axial direction.

8. A rotor as set forth in claim 6, including conical bolts arranged in transverse bores in the rotor body, said bolts being provided with bores which at one end are in communication with radial bores in the body of the rotor for introducing the cooling agent or withdrawing the same, and at the other end are connected with the tubular cooling member arranged at the blade feet.

9. A rotor as set forth in claim 6, including conical bolts arranged in transverse bores in the rotor body, said bolts being provided with bores which at one end are in communication with radial bores in the body of the rotor for introducing the cooling agent or withdrawing the same, and at the other end are connected with the tubular cooling member arranged at the blade feet, said tubular member provided with enlargements receiving said bolts, said bolt adapted to fix said member in the rotor body, and hollow screws pressing the enlargements close against the rotor body.

10. A cooled rotor suitable for use in gas turbines, and particularly in explosion turbines, comprising a ring of blades arranged upon the rim of said rotor, means whereby a cooling agent is circulated at the feet of the blades, and means for conducting away heat from the parts of the blades not immediately cooled by such cooling medium and struck by the driving gases, said last-mentioned means comprising inserts of higher heat-conducting material than said blades arranged within said blades at the upper portions thereof and contacting the blade feet in heat conducting relation.

11. A rotor as set forth in claim 1, including means for withdrawing heat from portions of the blades not immediately cooled by the circulating cooling medium, said means comprising elements of better heat conducting material than said blades in contact with said blade portions, and contacting the tubular member in heat conducting relation.

12. A rotor as set forth in claim 1, including copper cores inserted within the body of the blades and contacting in heat-conducting manner the portions of the blades struck by the driving gases and also the cooled blade feet.

13. A rotor blade as set forth in claim 1, including metallic inserts in the body of said blades of better heat-conducting material than said blades and connected in heat-conducting relation by metallic fusion with the uncooled portions of the blades struck by the driving gases, said insert extending to and contacting with the feet of the respective blades.

14. A rotor blade as set forth in claim 1, including metallic inserts in the body of said blades of better heat-conducting material than said blades and connected in heat-conducting relation with the uncooled portions of the blades struck by the driving gases and with the tubular cooling member.

15. A rotor as set forth in claim 1, including means for withdrawing heat from portions of the blades not immediately cooled by the circulating cooling medium, said means comprising elements of better heat conducting material than said blades in contact with said blade portions and connected in heat conducting relation with the tubular member, the contact between said inserts and the uncooled blade portions being interrupted by a heat insulation.

16. A rotor as set forth in claim 1, wherein the tubular member through which the cooling medium flows is formed of the material of the blade rim itself.

17. A rotor as set forth in claim 1, wherein said tubular member is composed of two annular flanges formed of the body of the blade rim, the outer end of said flanges being connected with each other in fluid-tight relation.

18. A rotor as set forth in claim 1, wherein the tubular member is composed of two annular flanges formed of the body of the rotor itself, the free end of said flanges being bent toward each other and connected along the outer edges by metallic fusion.

19. A rotor as set forth in claim 1, wherein the tubular member is formed of two annular flanges formed of the body of the rotor itself, the outer ends of said flanges being connected in fluid-tight manner, and the assembled blades being at least in part rigidly connected by metallic fusion with each other and with the rotor cheeks defining the blade groove and with the outer surface of the tubular member.

20. A rotor as set forth in claim 1, wherein the wall of the tubular member is yielding in character, so that said member is pressed into intimate contact with the blade feet by the centrifugal pressure of the cooling agent.

HANS HOLZWARTH.